United States Patent [19]

Cocke et al.

[11] Patent Number: 4,710,868

[45] Date of Patent: Dec. 1, 1987

[54] INTERCONNECT SCHEME FOR SHARED MEMORY LOCAL NETWORKS

[75] Inventors: John Cocke, Bedford; Brent T. Hailpern, Katonah, both of N.Y.

[73] Assignee: International Business Machines Corporation, Armonk, N.Y.

[21] Appl. No.: 626,260

[22] Filed: Jun. 29, 1984

[51] Int. Cl.⁴ .............................................. G06F 3/00
[52] U.S. Cl. ................................... 364/200; 364/900
[58] Field of Search ... 364/200 MS File, 900 MS File

[56] References Cited

U.S. PATENT DOCUMENTS

| | | | |
|---|---|---|---|
| 3,419,849 | 12/1968 | Anderson et al. | 364/200 |
| 3,444,525 | 5/1969 | Barlow et al. | 364/200 |
| 3,492,654 | 1/1970 | Fresch et al. | 364/200 |
| 3,560,934 | 2/1971 | Ernst et al. | 364/200 |
| 3,634,830 | 1/1972 | Baskin | 364/200 |
| 3,665,421 | 5/1972 | Rehhausser et al. | 364/200 |
| 3,723,976 | 3/1973 | Alvarez et al. | 364/200 |
| 3,768,074 | 10/1973 | Sharp et al. | 364/200 |
| 3,854,126 | 12/1974 | Gray et al. | 364/200 |
| 3,889,237 | 6/1975 | Alferness et al. | 364/200 |
| 3,905,023 | 9/1975 | Perpiglia | 364/200 |
| 4,077,059 | 2/1978 | Cordi et al. | 364/200 |
| 4,084,231 | 4/1978 | Capozzi et al. | 364/200 |
| 4,115,851 | 9/1978 | Nagano et al. | 364/200 |
| 4,136,386 | 1/1979 | Annunzlata et al. | 364/200 |
| 4,145,739 | 3/1979 | Dunning et al. | 364/200 |
| 4,155,119 | 5/1979 | De Ward et al. | 364/200 |
| 4,163,280 | 7/1979 | Mori et al. | 364/200 |
| 4,195,344 | 3/1980 | Yamazaki | 364/200 |
| 4,240,143 | 12/1980 | Besemer et al. | 364/200 |
| 4,245,306 | 1/1981 | Besemer et al. | 364/200 |
| 4,253,146 | 2/1981 | Bellamy et al. | 364/200 |
| 4,279,014 | 7/1981 | Cassonnet et al. | 364/200 |
| 4,285,040 | 8/1981 | Carlson et al. | 364/200 |
| 4,326,248 | 4/1982 | Hinai et al. | 364/200 |
| 4,394,649 | 7/1983 | Suchoff et al. | 340/711 |
| 4,394,731 | 7/1983 | Flusche et al. | 364/200 |

Primary Examiner—Gareth D. Shaw
Assistant Examiner—Christina Eakman
Attorney, Agent, or Firm—Sughrue, Mion, Zinn, Macpeak, and Seas

[57] ABSTRACT

A plurality of intelligent work stations are provided access to a shared memory through a switching hierarchy including a first array of mapping boxes for receiving a first address from an intelligent work station and including a virtual address and offset and for converting the virtual address into a terminal switch port designation and logical address, a first switch for forwarding the logical address and offset to the designated terminal switch port, a second array of mapping boxes for receiving the logical address and offset and for converting the logical address into a memory switch port designation and physical address, and a second switch for forwarding the physical address and offset to the designated memory switch port as an address to the shared memory.

7 Claims, 9 Drawing Figures

INTERCONNECT SCHEME FOR SHARED MEMORY LOCAL NETWORKS

BACKGROUND OF THE INVENTION

This invention is directed to an improvement in multi-terminal systems, and more particularly to a system in which a plurality of work stations share a large memory.

The recent rapid increase in the use of intelligent work stations, e.g., personal computers, has been accompanied by an increase in the demand for different techniques for interconnecting the work stations to make more efficient use of their collective resources. Some common interconnect schemes include ring-type and star-type local area networks. A significant advantage of such networks is not only the increased communication between stations but the more effective use of the collective data processing capacity of the terminals on the network.

One resource which lends itself quite well to a sharred arrangement is Random Access Memory (RAM). Random Access Memory capacity is a relatively expensive resource, and most work stations provide a relatively small amount of RAM in conjunction with a larger backing store, e.g., a disk storage. Constant storage and retrieval of data will typically require frequent disk accesses, thereby slowing down the overall data processing speed. On the other hand, providing any given work station with sufficient RAM to avoid frequent disk accesses would be prohibitively expensive and would often not be justified by the relatively few occasions on which such a large memory capacity would be needed. Thus, a significant savings in cost and increase in efficiency could be achieved by interconnecting a plurality of intelligent work stations to share a common memory, and the present invention is directed to an improvement in such a shared memory system.

In existing insertion-ring or broadcast-buss interconnect systems, local processing is encumbered by the local storage limitations at each work station, as described above, and it is an object of this invention to permit extended local processing unencumbered by local storage limitations, thereby providing a significant performamce advantage over insertion-ring or broadcast-buss networks.

Interconnection of known networks with conventional data base systems is sometimes complex due to the distribution of control information throughout the system, and it is a further object of this invention to provide a memory-coupled network wherein the interface with conventional data base systems is simpler and more efficient due to centralization of the control information.

It is a still further object of this invention to provide a shared memory system in which the bandwidth of each switch connection for coupling a given intelligent work station to the shared memory is driven only at the speed of the microprocessor of that station, thereby providing a significant advantage over typical insertion-ring or broadcast-buss interconnect systems wherein the ring bandwidth is driven by the sum of all active work station microprocessors.

SUMMARY OF THE INVENTION

The above and other objects of the invention are achieved by a shared memory system wherein a large random access memory is accessible by a plurality of intelligent work stations through a switching hierarchy, including: terminal mapping boxes each for implementing address translation for a respective terminal or work station; a first switch having a plurality of first ports each connected to a respective terminal mapping box, a plurality of second ports and means for selectively connecting any one of said first ports to any one of said second ports; memory mapping boxes for address translation each connected to a respective port of the first switch; and a second switch having a plurality of first ports each coupled to a respective one of the memory mapping boxes, a plurality of second ports each coupled to a respective portion of the shared memory, and means for selectively connecting any one of its first switch ports to its second switch ports.

Each terminal mapping box receives a local virtual address from the corresponding intelligent work station identifying a capability and including an offset and translates the capability into a terminal switch port designation and a logical address. The logical address and offset are then provided through the terminal switch to the designated second port of the terminal switch, and from there to an associated memory mapping box dedicated to that terminal switch port. The memory mapping box translates the logical address into a memory switch port designation and a physical address, and the physical address and offset are then provided through the memory switch to the designated second port of the memory switch. The intelligent work station thereby addressess a memory location in the portion of the shared memory corresponding to the designated second port of the memory switch, with the exact location in that shared memory portion being given by the offset portion of the address originally provided from the intelligent work station.

The translation tables in the memory mapping boxes are updated by a central memory control unit, so that each memory mapping box will at all times know the physical address in its memory module which corresponds to a received logical address. A communication services processor maintains a table of translation information for all capabilities currently available to any given intelligent work station, and some portion of this table will be maintained in each terminal mapping box. To exercise a capability, a terminal can load the capability into an appropriate register in the terminal mapping box, and the terminal mapping box will check to see if the capability is available for that terminal. Thereafter, the intelligent work station need only address the loaded register in order to utilize the desired capability. If the requested capability is not found in the terminal mapping box translation table, an inquiry is sent to the communication services processor to determine if the requested capability is available. If so, the translation table information is loaded from the communication services processor to the table in the terminal mapping box. If the requested capability is not available, an error code will be returned.

In a high performance environment, the intelligent work station micprocessors and local stores could be located close to the central memory and switches, with the terminal displays and keyboards remotely located and connected to the central system via moderate-speed serial links.

BRIEF DESCRIPTION OF THE DRAWINGS

The invention will be more clearly understood with reference to the following description in conjunction with the accompanying drawings, wherein:

FIGS. 5.1 and 5.2 are a flow chart describing the operation of the terminal mapping box of FIG. 1;

FIGS. 7.1 and 7.2 are a flow chart illustrating the operation of the communication services processor of FIG. 1.

DETAILED DESCRIPTION OF THE PREFERRED EMBODIMENT

Figure 1:
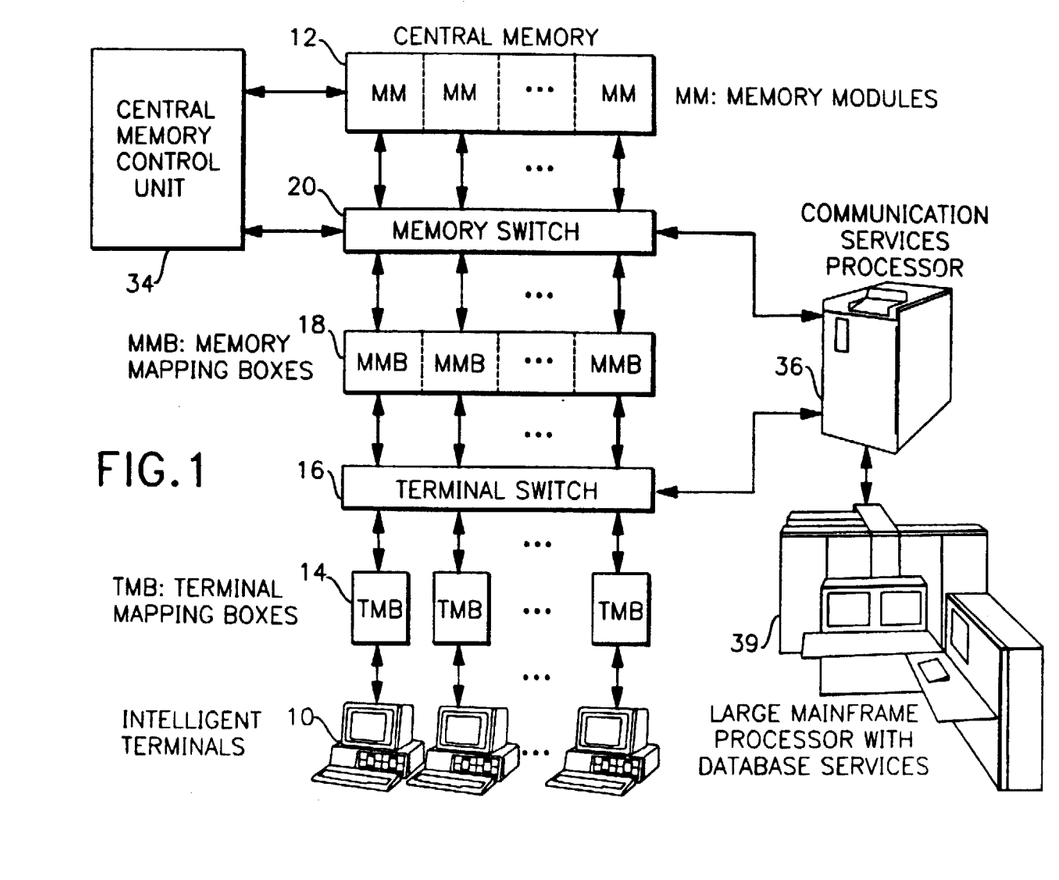
FIG. 1 is an overall diagram of the interconnect system according to the present invention.
Figure 3:
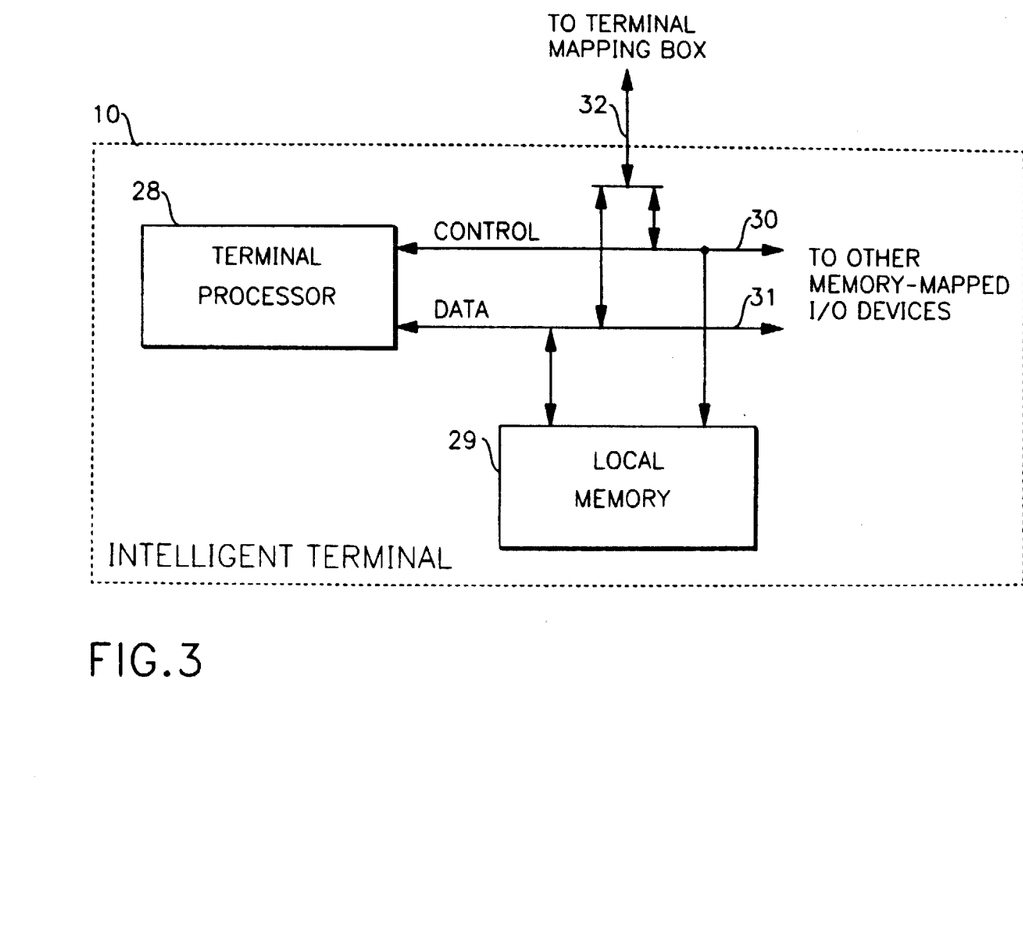
FIG. 3 is a diagram of essential components of an intelligent work station used in FIG. 1.

This invention is a system for sharing centralized virtual memory among distributed microprocessors, with FIG. 1 presenting a schematic block diagram of the overall system. As shown in FIG. 1, the distributed microprocessors comprise a plurality of intelligent work stations 10 which share a central memory 12. Access to the central memory 12 is provided via switching means comprising terminal mapping boxes 14, terminal switch 16, memory mapping boxes 18 and memory switch 20. Each work station, or intelligent terminal (IT) 10 may, as shown in FIG. 3, include a terminal microprocessor 22 for performing local processing unique to the requirements of the particular station, a local memory 24, control and data busses 26 and 28, and a bidirectional port 32 for communicating with a respective terminal mapping box.

The shared memory 12 is preferably partitioned into a set of independent memory modules, both to improve bandwidth through interleaved access and to permit control of the shared memory by a central memory control unit (CMCU) 34, which may be a multi-processor memory controller 34 of the type disclosed in co-pending and commonly assigned application Ser. No. 567,304 filed Dec. 30, 1983, the disclosure of which is incorporated herein by reference. The switches 16 and 20 are non-blocking switches, preferably cross-point switches, with each port on one side of the terminal switch 16 being dedicated to a respective terminal mapping box and each port on the other side of the terminal switch 16 being dedicated to a respective memory mapping box. Similarly, each port on one side of the memory switch 20 is dedicated to a respective memory mapping box, with each port on the other side of the memory switch 20 being dedicated to a respective memory module.

A communication services processor 36 communicates with the control unit 34 and memory mapping boxes 18 through the memory switch 20, and with the terminal mapping boxes through the switch 16 to maintain the address translation tables for use by the terminal mapping boxes and to perform other communication services such as interfacing to the main frame, locking, authorization checking, etc. The communication services processor 36 may be any one of a number of suitable processors well known in the art. The processor 36 may also communicate with a large mainframe processor 39 to permit access by the intelligent work stations 10 to expanded processing capability, if desired.

Figure 2:
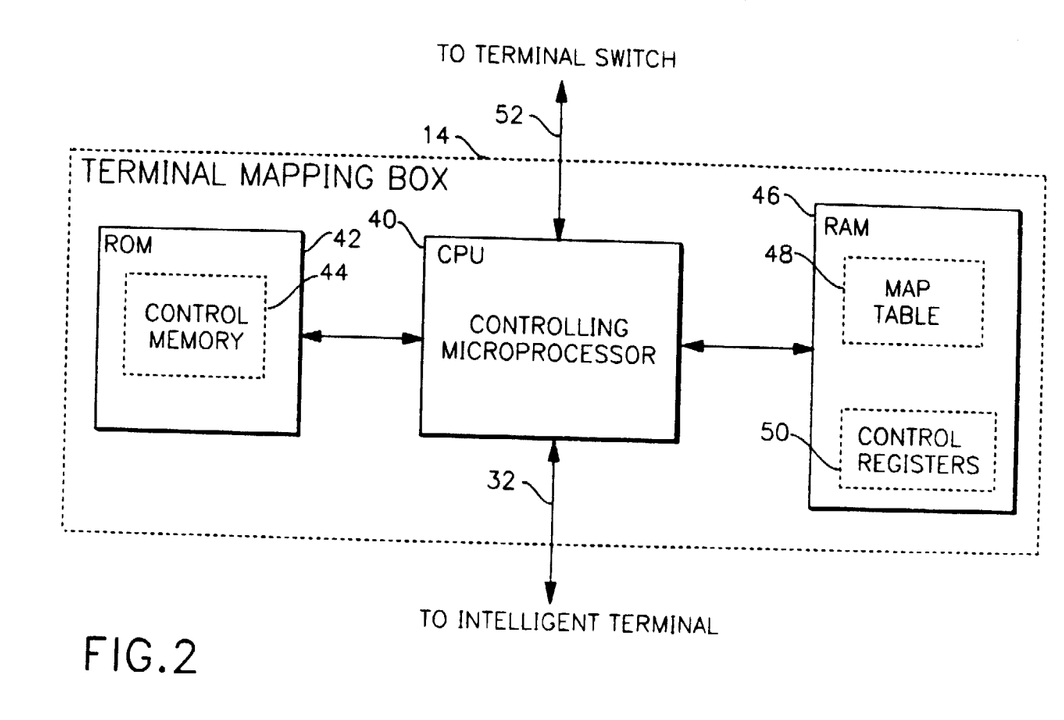
FIG. 2 is a diagram of essential components of a terminal mapping box used in FIG. 1.

Each terminal mapping box may, as shown in FIG. 2, include a microprocessor 40, a Read Only Memory (ROM) 42 containing a control memory 44, and a Random Access Memory (RAM) 46 including a map table 48 and control registers 50. A port 52 is provided for communication with a dedicated switch port on the terminal switch 16.

Figure 4:
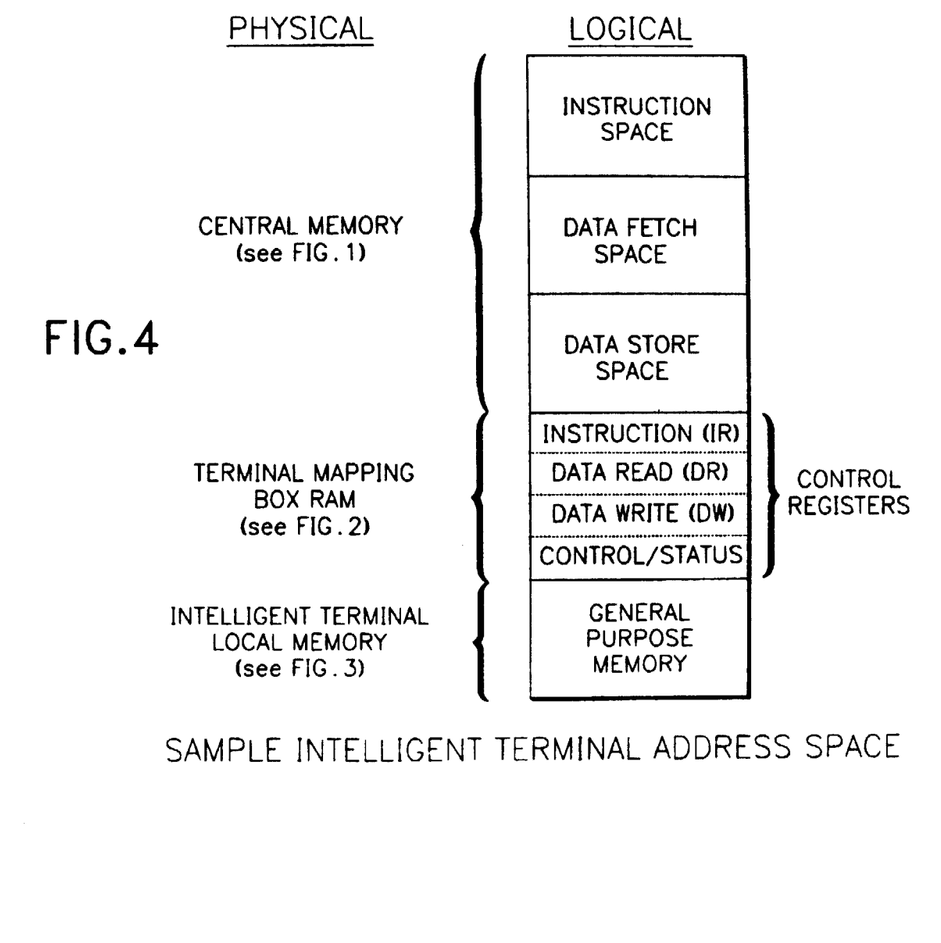
FIG. 4 is a diagram for explaining the address space of the intelligent work station of FIG. 1.

In the preferred embodiment of this system, each intelligent work station has its own local memory space which it can address in its normal fashion. The central memory 12 will only be accessed in those instances where a terminal 10 generates an address other than an address in local memory, and the simplest technique for differentiating between local and shared addresses is to access the shared memory any time the address generated by the work station exceeds the capacity of its own local store. Memory accesses issued by each work station 10 are assumed to contain sufficient control information to distinguish between instruction fetches (fetches), data fetches (loads) and data stores (stores). The address component of this control information is a virtual address, which frees the intelligent work station programming from the major constraint of limited local memory. By way of example, the address space of each intelligent work station may be as shown in FIG. 4.

Each terminal mapping box (TMB) may be located within or separate from its respective work station. In either case, the terminal mapping box determines whether the memory access issued by the intelligent work station is directed to local or shared memory. If the virtual address is below a predetermined value, then the local memory of the terminal will service the memory I/O, and no further mapping box activity is required. The cross-point switch and shared memory modules are not activated for local accesses. A virtual address above the predetermined value indicates a shared memory access, and the virtual address must then be transformed by the terminal mapping box into a switch port ID, a logical address and control data. To this end, each terminal mapping box RAM includes a plurality of control registers 50. Since memory accesses can usually be classified into Data Read (DR), Data Write (DW) or execution, i.e., Instruction (IR), the preferred embodiment of this invention provides three reigsters 50, although some other number could be provided. Using the control registers 50 and map table 48 in a manner to be described in more detail later, the terminal mapping box determines the output port of the terminal switch 16 to which the address is to be forwarded, and converts the virtual address and control information into a logical address and control information, with the address length and control codes being changed, if necessary, to meet switch protocol. The computed switch port ID, logical address and other control information are then sent to the terminal switch 16, the terminal switch 16 preferably comprising a passive switch controlled by the port ID to simply forward information to the memory mapping box 18 dedicated to the indicated terminal switch output.

Each memory mapping box (MMB) 18 will have a structure substantially the same as that shown in FIG. 2 for a terminal mapping box, and will include in its RAM a translation table for translating the logical addresses received from the switch 16 into a memory switch port ID indicating a particular memory module to be accessed and a physical address within that memory module. If the translation table in the memory mapping box indicates that the requested address is resident in the shared memory, the memory I/O operation is performed, with data either being written into the memory from the terminal or data being returned via the switches 20 and 16 and mapping boxes 18 and 14 for fetch and load accesses. If the memory mapping box determines that the requested address is not resident, a page-fault command is sent to the central memory control unit (CMCU) 34 which asynchronously determines and initiates the I/O operations needed to make the requested data resident. Mass-storage I/O devices may be directly connected to the central memory control unit 34 or may be remotely connected through a conventional data base system.

As described above, each intelligent work station may have available to it a number of different capabilities, or classes of access to the shared memory such as read/write access, read access to something already written, etc., and each TMB maintains a map table 48 containing information which will enable the TMB to translate the virtual address (capability indication) from the intelligent work station into a terminal switch port (TS Port) and logical address. The TMB table may also indicate the type of access (e.g., DR, DW or IR) to which the particular capability is directed. One example of a table to be maintained in the TMB may be as shown below in Table I:

TABLE I

| Capability | TS Port | Logical Address | Access |
|---|---|---|---|
|  |  |  |  |
|  |  |  |  |
|  |  |  |  |
|  |  |  |  |

The map table maintained in the TMB may in fact include a relatively small cache of a larger table of capabilities in the communications services processor (CSP) 36. The map table in the TMB can be maintained according to any number of known cache management algorithms intended to maintain in cache the capabilities most likely to be needed by the intelligent work station.

The table in each MMB 18 may be generally similar to that in the TMB's, but the MMB tables are needed only to translate a logical address into a memory switch port (MS Port) and physical address. Thus, an MMB table may be as shown below in Table II:

TABLE II

| Logical Address | MS Port | Physical Address |
|---|---|---|
|  |  |  |
|  |  |  |
|  |  |  |
|  |  |  |

As described above, each work station may have available to it a number of different capabilities or classes of access to the shared memory. The classes of access can be generally separated into three types, i.e., DR, DW and IR, and it is contemplated that at any given time a particular work station will only exercise one class of DR access, one class of DW access and/or one class of IR access. Accordingly, only three control registers 50 are provided in the memory space of the TMB as shown in FIG. 4. The function of each register 50 is to indicate the particular capability currently being used in each category. For example, when an intelligent work station requests a particular type of read access to the shared memory identified by capability access X, it may load into the DR register an associative address, e.g., a pointer value, identifying the address in the map table 48 corresponding to the requested capability. The TMB can check its translation table to confirm that the capability is valid. Henceforth, when the intelligent work station provides a read address, a portion of the read address, i.e., the virtual address, will designate the DR register. This virtual address will then be automatically translated into a TS Port and logical address in accordance with the data stored at the indicated location in the map table 48.

The operation of the system according to the present invention will now be described in more detail with reference to the flow charts of FIGS. 5-7.

There are essentially four different types of requests which may be issued by each intelligent work station. A request for a "new" capability is a request by the intelligent work station to exercise a particular type of access to the shared memory which has not yet been approved for the requesting terminal. For example, if a work station puts a request in its command register indicating that a particular type of write access is requested, the CSP 36 and CMCU 34 will check to see what is available and will cooperate to set aside an area in the central memory in which the work station can exercise its requested write capability, and the tables in the memory mapping boxes and terminal mapping boxes are appropriately updated. This capability then remains available to the work station as an "existing" capability until such time as the capability is relinquished by that terminal.

A second type of request to be issued by the intelligent work station is a request for the TMB to load an existing capability into a control register so that the work station can begin exercising this capability in a designated area of the shared memory which has already been set aside.

A third type of request issued by an intelligent work station is a request to release, or terminate, an existing capability, thereby causing the CSP 36 and CMCU 34 to delete the corresponding entries from the translation tables and permitting the previously reserved area in the shared memory to now be used by other stations.

A fourth request to be issued by an intelligent work station is an access request, i.e., exercising a capability which is currently resident in one of its control registers.

Figure 51:
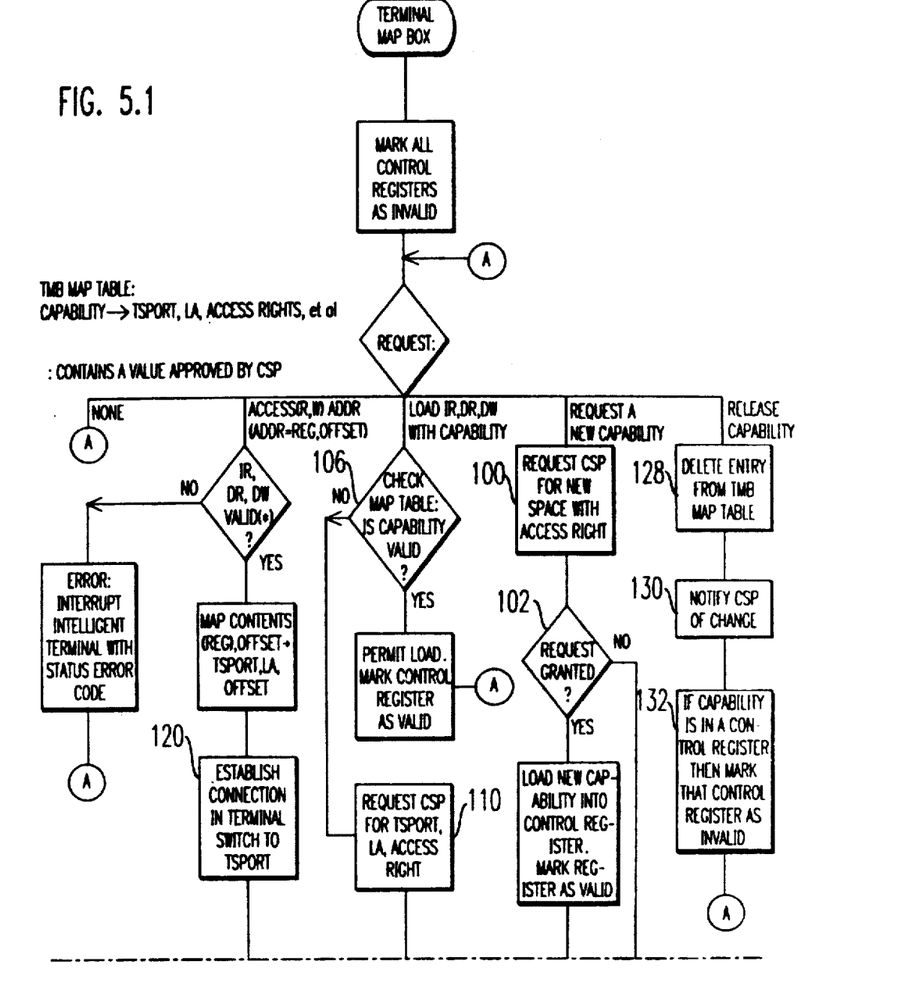
Figure 52:
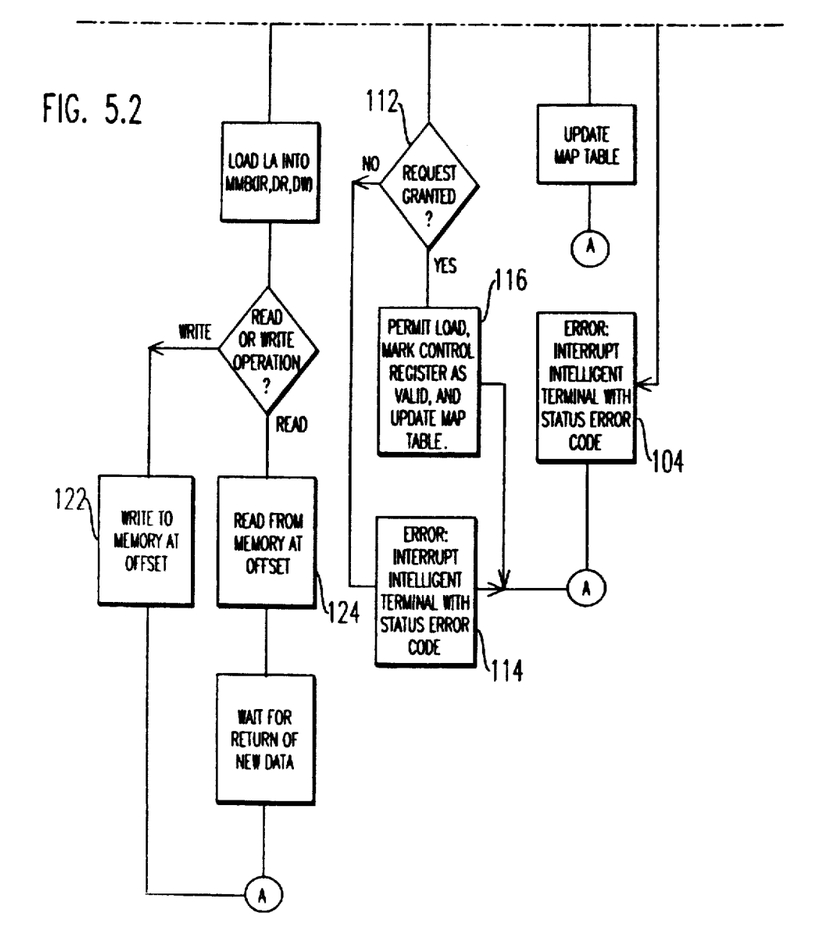
Figure 71:
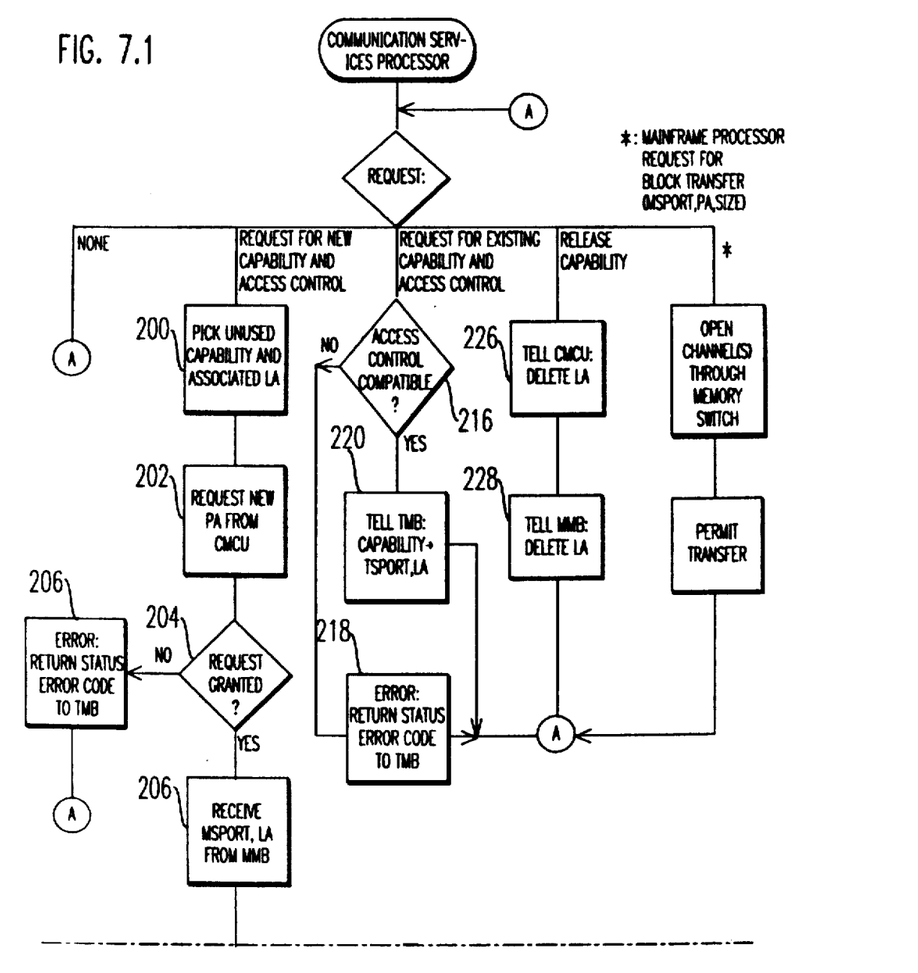

The processing of the different types of requests issued from an intelligent work station will now be described. With reference first to FIGS. 5.1 and 5.2 showing a flow chart illustrating the operation of the terminal mapping box, the terminal mapping box initially marks all control registers 50 as invalid. This may be accomplished, e.g., during an initialization routine on power-up. The TMB then waits for a request from its work station. Upon receiving a request for a new capability, the TMB at step 100 forwards a request to the CSP for a new space in the shared memory to be set aside for a particular type of access by the requesting station. As shown in FIG. 7.1, the CSP at step 200 then selects an unused capability number and associated logical address and at step 202 forwards a request to the CMCU 34 to identify an available physical address in the shared memory 12. If the CMCU 34 does not grant this request, e.g., if there is insufficient shared memory space available, the CSP at step 206 will return a status error code to the TMB. Upon receiving this error code at step 102 in FIG. 5.1, the TMB will advance to step 104 and will interrupt the requesting terminal with a status error code. The requesting terminal can then repeat its request either immediately or at some later time.

If the request by the CSP for a new physical address from the CMCU is granted at step 204 in FIG. 7.1, the CSP will receive the MS Port and physical address from the CMCU. At step 208, the CSP will choose one of the MMB's to service future requests for this capability, and at step 210 the CSP will then inform the CMCU that a particular combination of (MMB, LA) translates to (MS Port, PA). The CMCU will then enter this information in a master table.

Figure 72:
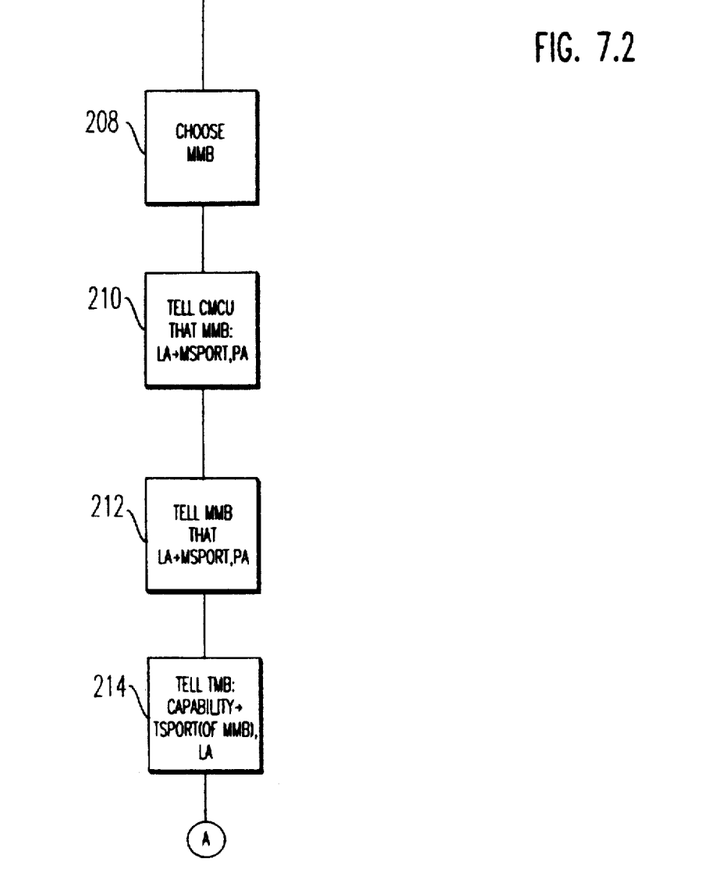

At step 212 in FIG. 7.2, the CSP will then inform the chosen MMB of the translation data from logical address to MS Port and physical address to be entered into its map table, and at step 214 the CSP finally informs the TMB of the translation data for mapping the requested capability to a TS Port and logical address. Upon detecting at step 102 in FIG. 5.1 that its request has been granted, the TMB updates its map table to include the new capability and loads the new capability into the appropriate control register. That control register is then marked as valid.

A second type of request issued by the intelligent work station is a request for an "existing" capability which is already available to the work station. In such a case, the station loads the desired capability into the appropriate contral register and the TMB checks its map table 48 at step 106 to verify that the capability is available. If the availability is confirmed, the control register is then marked as valid. If the comparison with the map table 48 yields a negative result, the TMB request the CSP for a TS Port, logical address and corresponding access right at step 110. The CSP, at step 216 in FIG. 7.1, examines the master capability table to determine if the requested capability is one that has already been made available to the requesting intelligent work station. If not, a status error code is returned to the TMB at step 218, is detected by the TMB at step 112 in FIG. 5.1, and the work station is interrupted with a status error code at step 114.

If the CSP determines from its capability table that the requested capability is available to the requesting work station, the CSP provides the map table data to the TMB at step 220. The TMB, at step 116 in FIG. 5.2, updates its map table 48 and marks the control register as valid. If the TMB notes that it has been asked to load, e.g., a write capability into a DR register, the status register would not indicate a successful load, and an error code would be sent back to the requesting station.

The above description concerns a request by the intelligent work station for a new capability or a request for an existing capability not currently stored in a control register 50. Once either of these two processes have been completed, the shared memory can be accessed by the work station by merely providing the access address to the TMB. More particularly, with reference to FIG. 5.1, the TMB will receive from the work station an access address designating a register and an offset. The TMB at step 120 will examine the addressed control register to determine whether or not it has been marked as valid, and if it is not valid an error code is sent back to the work station to indicate to the station that it must first submit a request to load a desired capability into the register. If the register contents are valid, i.e., if the register contains a capability value which has already been approved by the CSP, the TMB consults its map table 48 and substitutes a TS Port and logical address for the portion of the virtual address from the intelligent work station which designated the register. The TMB at step 120 forwards the TS Port, logical address and offset to the terminal switch 16 which establishes a connection between the TMB and designated TS Port, so that the logical address and offset are forwarded to the corresponding MMB.

Figure 6:
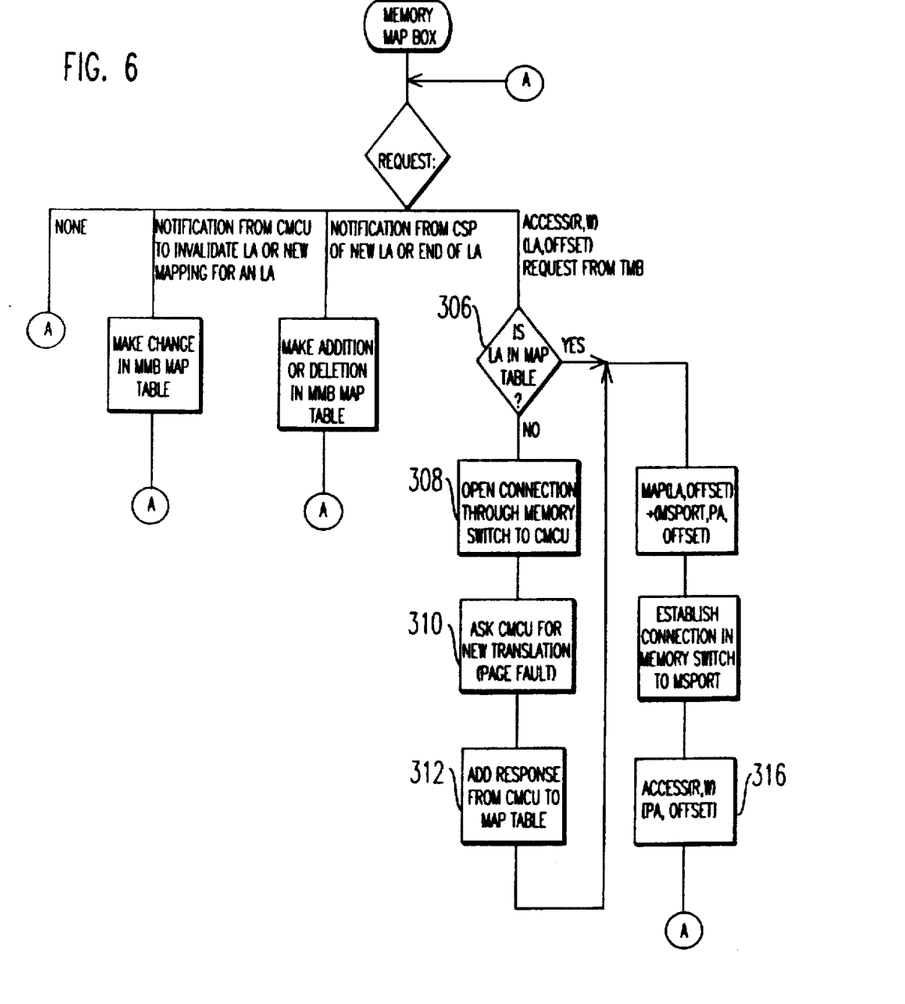
FIG. 6 is a flow chart illustrating the operation of a memory mapping box of FIG. 1.

At step 306 in FIG. 6, the MMB examines its own map table to determine if the received logical address is resident. It is possible that, although an area in the shared memory has been set aside for this assigned capability, the CMCU may have found it necessary to make this reserved memory area available for some other purpose. In such a case, the CMCU will have written any data in this memory area out to its backing store and will have deleted the corresponding entry from the appropriate MMB map table. If the MMB finds at step 306 that the requested logical address is not resident in its map table, it will open a connection to the CMCU at step 308 and at step 310 will request the CMCU for new translation data. The CMCU 34 asynchronously determines and initiates the I/O operations needed to make the requested data resident, and this can preferably be accomplished by using an asynchronous array of microprocessors in the CMCU as described in more detail in said copending application Ser. No. 567,304. The CMCU will retrieve the data from the backing store and will place it in the shared memory 12 and will then inform the MMB of the MS Port and physical address at which the desired data can be accessed. At step 312 in FIG. 6, the MMB updates its map table with the new translation data.

After the MMB map table has been appropriately updated at step 312, or if the logical address is originally found in the map table in step 306, the MMB substitutes the corresponding MS Port and physical address for the received logical address, and establishes a connection to the indicated MS Port in the memory switch 20. At step 316, the MMB accesses the memory location defined by the physical address and offset, e.g. with the physical address indicating the beginning of a block of memory in which the requested record can be found, and the offset indicating the position within that block, as is common in the art. After the desired memory location has been accessed, the TMB proceeds as illustrated in FIG. 5.2, i.e., writing to the memory location at step 122 or reading from the memory location at step 124 and waiting for the return of data.

A final category of request from the intelligent work station to its TMB may be a request to delete an existing capability which is determined to be no longer necessary, thereby freeing up memory capacity in the shared memory 12. As shown in FIG. 5.1, upon receiving a request from its work station to release an existing capability, the TMB at step 128 will delete the corresponding entry from its map table. At step 130, the CSP is notified of the deletion, and the CSP operates as illustrated at steps 224–228 in FIG. 7.1, i.e., deleting the capability from its own map table and informing the CMCU and appropriate MMB that the logical address translation data should be deleted from their tables. At step 132 in FIG. 5.1, the TMB determines if the capability to be deleted is currently in a control register. If so, that register is marked as invalid.

In addition to the request for access from the intelligent work stations, the CSP 36 may also process requests for block transfers, as shown in FIG. 7.1. In response to such a request from mainframe processor 38 identifying a particular MS port, physical address and block size, the CSP opens a channel to the indicated MS Port through the memory switch 20 and implements the block transfer.

A further improvement according to the present invention may reside in the physical location of the various system components. Since data transfer between the shared memory and the microprocessors in the intelligent work stations may advantageously occur at a relative high rate, e.g., 1 megabyte per second, or 10 megabytes per second, it would be advantageous to minimize the length of this data transfer path due to the relatively high cost of transmission media capable of carrying data at such high rates. Thus, the system could be arranged with the shared memory 12, mapping boxes 14 and 18, switches 16 and 20, CMCU 34, CSP 36 and the microprocessor portion of each intelligent work station 10 all centrally located to minimize their data transfer paths. Keyboard and display combinations can be located at various remote locations and connected to the central location via data transfer lines of significantly greater length. However, since the data transfer between the keyboard/monitor combination and the remainder of the data processing system need only occur at relatively low data rates such as 2400 or 9600 bytes per second, a significant cost savings could be achieved. A further advantage is that all system components requiring a higher degree of maintenance would be centrally located while only the low-maintenance keyboard and display would be remotely located.

The above-described local network of distributed processors is memory coupled, permits memory-mapped I/O to access shared files that are buffered within the system, provides capability accessing of a remotely located data base, permits on-line reconfiguration of all resources, and can be implemented using existing technology. The bandwidth of each switch connection is driven only by the speed of the IT microprocessor, and the system permits extended local processing unencumbered by local storage limitations while also providing a significant cost/performance edge over insertion-ring or broadcast-networks.

I/O accesses to shared files are buffered centrally within the interconnect system rather than funneled through a remote file server. This permits hierarchical staging and isolation of I/O accesses, without loss of integrity due to the capability mechanism provided by the mapping boxes and central address-space allocation.

The interface between this type of memory-coupled network and conventional data-base systems is much simpler and more efficient than gateway-coupled ring networks due to the centralization of control information. Direct support of capability addressing facilitates off-loading of data-base integrity checks, etc.

In a further modification, the system could be designed for shared capabilities, e.g., one terminal writing information into the shared memory could indicate that all other terminals in system may be given read access to that data, or it could indicate that only certain terminals or terminals provided the required password could have access. The CSP would store information indicating to which intelligent work stations each capability is available, and the CPS would also preferably maintain a record of how many stations were using the capability of any given time. If the station creating the capability subsequently requested that it be released, the CSP would not only have to delete the capability from its table but would have to ensure that the capability was deleted from all terminal mapping box translation tables. Steps 224–228 in FIG. 7.1 would then only be performed if the use counter indicated that the capability being released was no longer in use by any work stations, so that the logical address translation data would not be needed.

It should be appreciated that various changes and modifications can be made to the above-described system without departing from the spirit and scope of the invention as defined in the appended claims.

What is claimed is:

1. A data processing system of the type including a plurality of intelligent terminals, a shared memory, and interconnect means for providing access to said shared memory by said intelligent terminals, said interconnect means comprising:
   a plurality of first mapping boxes for receiving first addresses from said intelligent terminals, said first addresses including a virtual address and offset, and for converting said virtual addresses to respective terminal switch port designations and logical addresses;
   a first switch having a plurality of first switch ports coupled to said first mapping boxes and having a plurality of second switch ports, said first switch for forwarding said logical addresses and offsets as second addresses to respective second switch ports corresponding to said terminal switch port designations;
   a plurality of second mapping boxes for receiving said second addresses and converting said second addresses to respective memory switch port designations and physical addresses; and
   a second switch having a plurality of first switch ports for receiving said memory switch port designations and physical addresses and having a plurality of second switch ports connected to address inputs of said shared memory, said second switch for forwarding said physical addresses and offsets to respective second ports of said second switch corresponding to said memory switch port designations.

2. A data processing system as defined in claim 1, wherein said shared memory comprises a plurality of memory modules each having at least one input port coupled to a respective one of said second ports of said second switch.

3. A data processing system as defined in claim 1, wherein each of said first mapping boxes includes translation table means for conversion of a plurality of different virtual addresses to respective combinations of terminal switch port designation and logical address, and wherein each of said second mapping boxes includes translation table means for conversion of a plurality of different logical addresses to respective combinations of memory switch port designation and physical address.

4. A data processing system as defined in claim 1, wherein said interconnect means provides each of said intelligent terminals with a plurality of different capabilities, e.g., classes of access, which can be used in accessing said shared memory, each first mapping box including at least a first register addressable by a virtual address from its associated intelligent terminal and a translation table of a plurality of capabilities currently available for use by said associated terminal, said translation table indicating the terminal switch port designation and logical address corresponding to each said capability, said associated intelligent terminal including means for loading into said first register a value representing a requested capability, said first mapping box including conversion means coupled to said translation table for, upon receiving a subsequent first address from said associated intelligent terminal with a virtual address designating said first register, converting said virtual address to a terminal switch port designation and logical address in accordance with the contents of said first register.

5. A data processing system as defined in claim 4, wherein said translation table means in said first mapping box is a partial list of all capabilities currently available to said associated intelligent terminal, said system further including means for maintaining a master list of all capabilities currently available to said associated intelligent terminal, said first mapping box including means for checking said master list when a requested capability is not found in said translation table.

6. A data processing system as defined in claim 4, wherein each said intelligent terminal includes means for issuing a request for a capability not currently available to each said intelligent terminal, said system further including processor means (34, 36) responsive to said request for allocating a predetermined area of said shared memory to the use of said requested capability, said processor means loading into said translation table in one of said second mapping boxes the memory switch port designation and physical address corresponding to said allocated memory area together with the logical address corresponding to the requested capability, and loading into the translation table in one of said first mapping boxes a capability designation together with a terminal switch port designation and logical address corresponding to said requested capability.

7. A data processing system as defined in claim 1, wherein each said intelligent terminal includes at least a keyboard, monitor, microprocessor and bus means for coupling said intelligent terminal to said interconnect means, and wherein said shared memory, interconnect means and microprocessor are centrally located while said keyboards and monitors of said intelligent terminals are remotely located at physically separate locations from said microprocessors.

* * * * *

UNITED STATES PATENT AND TRADEMARK OFFICE
CERTIFICATE OF CORRECTION

PATENT NO. : 4,710,868

DATED : December 1, 1987

INVENTOR(S) : JOHN COCKE, BRENT T. HAILPERN, LEE W. HOEVEL, EUGENE SHAPIRO, MARION L. BLOUNT

It is certified that error appears in the above-identified patent and that said Letters Patent is hereby corrected as shown below:

Under Inventor: Delete "John Cocke, Bedford; Brent T. Hailpern, Katonah, both of N.Y." and
insert
--John Cocke, Bedford, N.Y.; Brent T. Hailpern, Katonah, N.Y.; Lee W. Hoevel, Yorktown Hgts., N.Y.; Eugene Shapiro, Stamford, C.T.; Marion L. Blount, Mahopac, N.Y.--

Signed and Sealed this

Sixteenth Day of May, 1989

Attest:

DONALD J. QUIGG

Attesting Officer

Commissioner of Patents and Trademarks